June 3, 1958 A. H. WOLFERZ 2,837,716
ELECTRODYNAMOMETER INSTRUMENT
Filed July 11, 1952 3 Sheets-Sheet 1
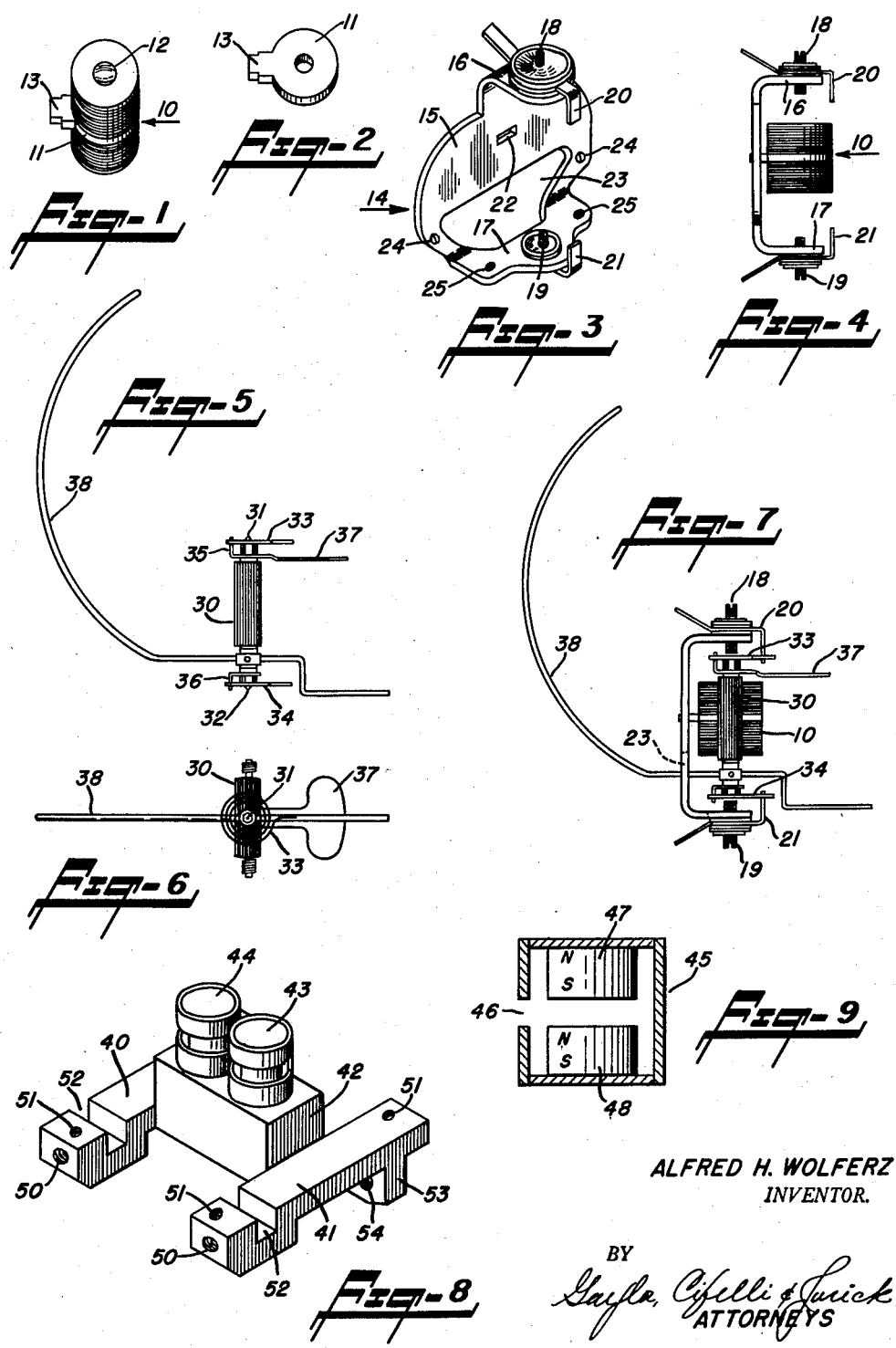
ALFRED H. WOLFERZ
INVENTOR.

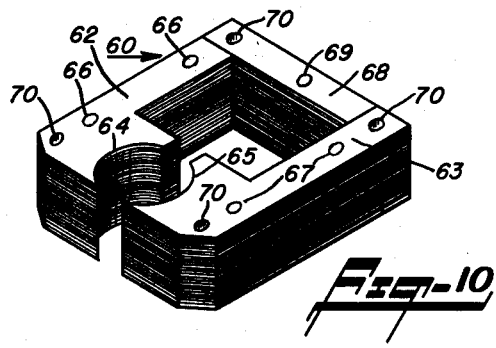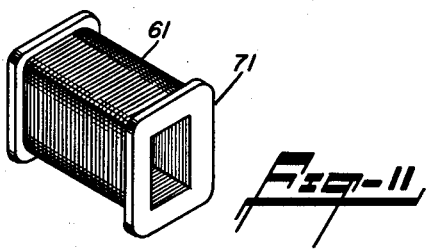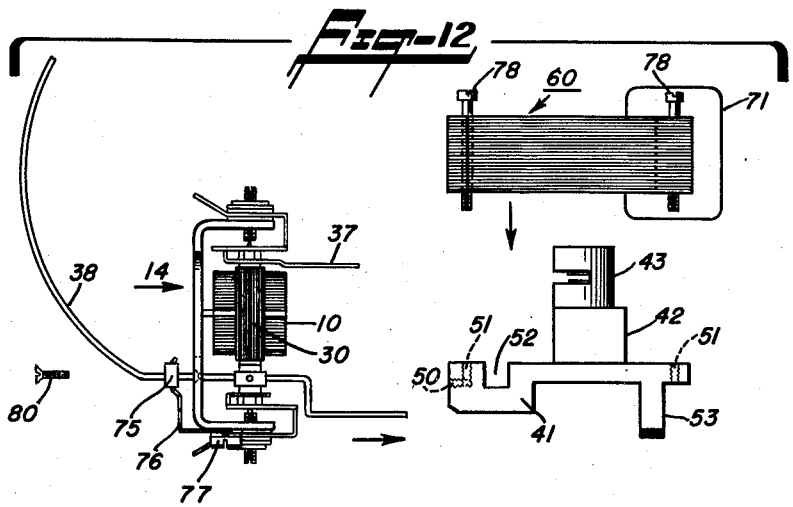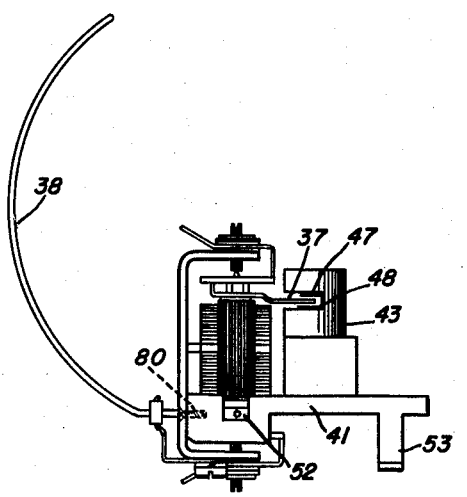
ALFRED H. WOLFERZ
INVENTOR.

June 3, 1958
A. H. WOLFERZ
2,837,716
ELECTRODYNAMOMETER INSTRUMENT
Filed July 11, 1952
3 Sheets-Sheet 3
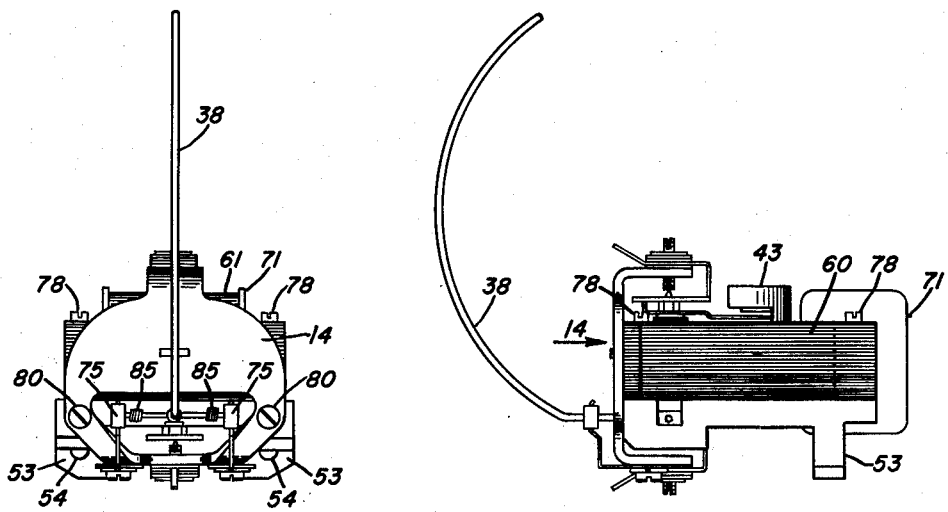
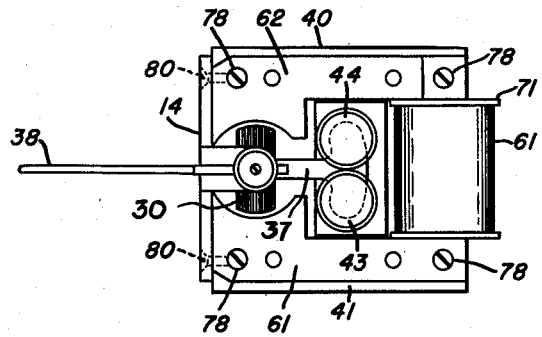
ALFRED H. WOLFERZ
INVENTOR.
BY
ATTORNEYS

United States Patent Office 2,837,716
Patented June 3, 1958

2,837,716

ELECTRODYNAMOMETER INSTRUMENT

Alfred H. Wolferz, Hillside, N. J., assignor, by mesne assignments, to Daystrom, Incorporated, Murray Hill, N. J., a corporation of New Jersey Application July 11, 1952, Serial No. 298,357

7 Claims. (Cl. 324—144)

This invention relates to electrical measuring instruments and more particularly to instruments of the iron-core electrodynamometer type.

In producing instruments of the class contemplated by the invention considerable difficulty has been experienced in the design of an instrument of small size, light weight and one which can be assembled conveniently and at low cost.

An object of this invention is the provision of an improved iron-core electrodynamometer instrument of small size, light weight and including a novel construction and assembly whereby the movable element and soft-iron core may be assembled as a unit apart from the field coil and yoke structure.

An object of this invention is the provision of a novel assembly for an iron-core electrodynamometer instrument wherein the movable element and soft-iron core are supported in proper operative position by a single U-shaped bracket.

An object of this invention is the provision of an iron-core electrodynamometer instrument wherein the movable element and the soft-iron core are assembled in a U-shaped bracket that is, in turn, secured to a mounting base that also carries the yoke and field coil.

An object of this invention is the provision of an iron-core electrodynamometer instrument comprising a mounting base, a substantially-rectangular yoke carrying a field coil and removably secured to the base, a U-shaped bracket carrying a soft-iron core and removably secured to the base, bearing members carried by the legs of the U-shaped bracket, a wire-wound coil pivotally supported by the bearing members and rotatable about the core, and means including the said base for securing the instrument within a housing.

These and other objects and advantages will become apparent from the following description when taken with the accompanying drawings illustrating the invention. It will be understood the drawings are for purposes of illustration and are not to be construed as defining the scope or limits of the invention, reference being had for the latter purpose to the appended claims.

In the drawings wherein like reference characters denote like parts in the several views:

Figure 1 is an isometric view of the soft-iron core;

Figure 2 is an isometric view of the core-supporting member;

Figure 3 is an isometric view of the U-shaped bracket carrying alined bearing members;

Figure 4 is a side view showing the soft-iron core secured to the U-shaped bracket;

Figure 5 is a side view of the movable element including a wire-wound coil, pointer, damping vane and spiral springs for conducting current to the coil;

Figure 6 is a top view of the movable element;

Figure 7 is a side view showing the movable element pivotally supported by the U-shaped bracket for rotation about the soft-iron core;

Figure 8 is an isometric view of the mounting base carrying the damping magnets;

Figure 9 is a cross-sectional view, drawn to an enlarged scale, of one of the damping magnets;

Figure 10 is an isometric view of the laminated yoke;

Figure 11 is an isometric view of the field coil supported by a frame;

Figure 12 is an exploded side view showing the three main components of the instrument, that is, the assembled movable element and core, the mounting base and the field coil mounted on the yoke;

Figure 13 is a side view showing the movable element and core unit secured to the mounting base;

Figure 14 is similar to Figure 13 and showing the completely assembled mechanism;

Figure 15 is a front view of the assembled mechanism; and,

Figure 16 is a top view of the assembled mechanism.

Referring now to Figures 1 and 2, the soft-iron core 10 is made up of a plurality of disc-shaped laminations stacked on both sides of a core-positioning member 11 which may be made of a non-magnetic material such as brass. The member 11 and each of the core laminae include a central hole and the assembly is secured together by a suitable rivet 12 that passes through the alined holes. It may here be pointed out that the member 11 includes a radially-extending projection that terminates in a reduced-width end 13, said end adapted for insertion into an appropriate rectangular aperture when the core assembly is secured to a mounting bracket, as will now be described.

Figure 3 illustrates the nonmagnetic mounting bracket 14, formed from sheet material into approximately U-shape in edge view (see Figure 4) having a base portion 15 and the integral, spaced legs 16 and 17 carrying the alined jewel screws 18, 19, respectively. Those skilled in this art will understand that each jewel screw preferably carries a jewel bearing adapted to accommodate the pointed pivots of the instrument movable element and that the associated abutments 20, 21, each manually rotatable about their respective jewel screws, serve as a means for securing the outer ends of the instrument springs through which current is conducted to a wire-wound movable coil. The nuts and associated washers that secure the jewel screws and abutments in position are of conventional construction, it being apparent that suitable insulating means must be employed to electrically insulate at least one of the abutments from the bracket. A rectangular aperture 22 is provided in the bracket base 15, said aperture having dimensions such that the end 13 of the flat core-positioning plate 11 (see Figures 1 and 2) will pass nicely through the aperture. When the shoulders formed in the radially-extending portion of the member 11 abut the front surface of the bracket base 15, the end 13 extends somewhat beyond the rear surface of the bracket whereby the protruding end may be peaned over or staked, thereby firmly securing the core to the bracket with the core axis alined with the jewel screws, as shown in Figure 4.

As shown in Figure 3, the bracket base also includes a relatively-large opening 23 (through which the instrument pointer extends when the movable coil is assembled for pivotal movement about the soft-iron core), a pair of holes 24 (which accommodate fastening screws which secure the bracket to the instrument base) in upwardly-diverging portions framing the sides of said opening 23, and a pair of threaded holes 25 (which serve to accommodate the screws that secure conventional pointer-stops), all as will become more apparent as the description proceeds.

Reference is now made to Figures 5 and 6 which are side and top views, respectively, of the movable element, Such element comprises a wire-wound movable coil 30 carrying alined pivots 31, 32, spiral springs 33, 34, and abutments 35, 36, all conforming to conventional practice. A damping vane 37, made of suitable thin sheet metal, is secured to the upper surface of the coil and a pointer 38 is secured to the lower coil surface, curved upwardly therefrom and extends to a considerable distance above the top of said coil and the instrument to cooperate with a scale plate appropriately formed and positioned, said vane and pointer being secured to the coil by means of conventional pivot bases and cooperating nuts.

Figure 7 illustrates the instrument movable coil mounted in operating position on the U-shaped bracket, said coil being pivotally supported by the jewel screws 18, 19 for rotation about the soft-iron core 10, it being noted that the pointer 38 extends through the opening 23 provided for this purpose in the bracket base. The outer convolutions of the spiral springs 33, 34 are soldered to the associated abutments 20, 21, at least one of such abutments being electrically insulated from the bracket. Thus, current can be conducted into and out of the movable coil by wire leads soldered to the ends of the two abutments. It will now be clear that the movable coil, pointer, damping vane and core assembly constitutes a unit apart from the necessary field coil and yoke structure of the instrument. The assembly of such unit is simple and all clearance gaps between the springs and the coil, and between the coil and the core, are open for inspection and, when necessary, readily accessible for the removal of fuzz, lint or other foreign matter. The important point here stressed is the ease with which all necessary adjustments and tests can be made on the assembled unit shown in Figure 7. The drawings were made from an actual production instrument, drawn approximately to a scale of 1.5:1, and illustrate the small size of an instrument embodying the construction features of this invention.

Reference is now made to Figure 8 which shows the mounting base of the instrument. Such base, which may be cast of aluminum or other light, non-magnetic metal, comprises the parallel-extending arms 40, 41 joined by a solid, raised portion 42 that forms a platform elevated above the top surfaces of said arms for the support of the damping magnet devices 43, 44, said devices being secured in fixed position by any suitable means as, for example, cement. As shown in the central, cross-sectional view of Figure 9, each damping device comprises a soft-iron shell 45 having a slot 46 therein. A pair of axially-aligned permanent magnets 47, 48 are secured in spaced position within the shell with the polar surfaces arranged in series as shown, thereby providing a strong magnetic field between the two magnets. The damping vane carried by the movable coil is adapted to move laterally through the gap between the permanent magnets. Since the damping vane is made of current-conducting material, its movement through the magnetic flux field results in induced eddy currents flowing within the vane, the magnitudes of such currents depending on the strength of the flux field and the motional velocity of the vane. The magnetic reaction between the magnetic flux cut by the vane and that resulting from the eddy currents is such that it opposes movement of the vane thereby providing a damping action for the instrument movable coil. A more detailed disclosure of the damping devices will be found in United States Patents Nos. 2,353,617 and 2,353,618, issued July 11, 1944, to Francis X. Lamb.

Referring again to Figure 8, the mounting base includes a pair of threaded holes 50 in its end faces (which are of areas sufficiently large for that purpose, said holes being spaced apart a distance corresponding to that of the holes 24 in the U-shaped bracket (see Figure 3), four threaded holes 51 (which serve to secure the laminated yoke to the base as will be described hereinbelow), transverse slots 52 (whose purpose will also be described hereinbelow), and the downwardly-depending legs 53, each leg including a threaded hole 54. The legs 53 and the holes 54 serve as means for fastening the entire base to a suitable support extending upwardly from the instrument housing. Since my instrument can be housed within any type of case, no particular case is here shown.

Reference is now made to Figures 10 and 11 which show the laminated yoke 60 and the field coil 61 of the instrument. The yoke is of the C type comprising the side arms 62, 63, having complementary, arcuate surfaces 64, 65 formed on a common radius. The laminae of each side arm are secured together by the rivets 66 and 67 and the cross arm 68 of the C is formed by a stack of straight laminae secured together by a rivet 69. Those skilled in this art will understand that the ends of the laminae forming the side arms 62, 63 and the ends of the cross arm 68 are alternately long and short whereby the cooperating ends of these members alternately overlap each other to form joints having good mechanical and flux-carrying characteristics. In completing the yoke, the side arms and the cross arm may be placed in a suitable fixure designed to maintain a proper spacing between the arcuate surfaces 64, 65 and the four corner holes 70 may be formed by a drilling operation. Preferably, however, such holes may be punched in the individual laminae in the same operation by which the laminae are punched to the proper shape. The holes 70 are accurately positioned and correspond to the threaded holes 51 formed in the mounting base (see Figure 8) whereby the yoke can be supported by the upper surfaces of the base arms 40, 41 and secured firmly thereto by individual screws passing through the corner holes of the yoke into the threaded holes of the base arms. Actually, the field coil 61, carried by the frame 71 is inserted over the straight leg 68 of the yoke before the yoke is secured to the mounting base as just described.

From the description given to this point it is clear that an electrodynamometer instrument made in accordance with my invention comprises three main units, namely, the U-shaped bracket carrying the movable coil and core, the mounting base carrying the instrument damping devices, and the yoke carrying the field coil. These three units are shown in the side view of Figure 12 in proper relative position for assembly. The mechanism of the instrument, comprising the U-shaped bracket 14 carrying the soft-iron core 10 and the movable coil 30 is shown in the completed state, that is, with the pointer stops 75 supported by wires 76 and screws 77, the latter being threaded into the holes 25 (see Figure 3) provided for this purpose in the lower leg of the bracket. The yoke 60, carrying the field coil on the frame 71 is shown with the fasteining screws 78 extending through the corner holes 70 (see Figure 10) provided in the yoke. In assembling the three main units together, the U-shaped bracket 14 is secured to the mounting base by two screws 80 that pass through the two holes 24, in the bracket (see Figure 3), into the alined, threaded holes 50 in the arms 40, 41 of the base (see Figure 8). Such partial assembly is shown in Figure 13, it being noted that the end of the damping vane 37 is now positioned within the slots of the damping devices and in the gap between the permanent magnets 47, 48. It may here be pointed out that the transverse slots 52, in the arms of the mounting base, are alined with the lower pivot base of the movable coil whereby the entire movable mechanism may be balanced by adjustment of the conventional balance weights carried by the cross arms of the pointer, such adjusting operation being performed by means of a suitable tool passing through the transverse slots 52. The laminated yoke 60 (see Figure 12) is now brought down to rest upon the upper surface of the mounting base arms and these two units are secured together by screwing the screws 78 into the threaded holes 51 provided in the base arms 40, 41.

Figures 14 to 16 are side, front and top views, respectively, of the completely assembled instrument. The front view of the instrument, Figure 15, shows the screws 80 which secure the U-shaped bracket 14 to the arms of the mounting base, the balance weights 85 on the cross arms of the pointer 38, and the two pointer stops 75. The top view of the instrument, Figure 16, clearly shows the movable coil 30 rotatable within the arcuate gaps formed in the yoke and the damping vane 37 disposed in operative position with respect to the damping devices 43, 44. The curved pointer 38, shown in the illustrated embodiment of the invention is designed for use with a hemispherical scale plate of the type now generally used in aircraft navigation instruments, such scale plate being supported in proper position relative to the pointer by any suitable means associated with the instrument case. Obviously, any desired pointer shape and scale plate mounting may be employed.

Having now described my invention in detail in accordance with the patent statutes, those skilled in this art will have no difficulty in making variations and modifications to meet desired, or required, conditions with respect to a given instrument made in general accordance with this invention. Such variations and modifications may be made without departing from the scope and spirit of the invention as set forth in the following claims.

I claim:

1. An iron-core electrodynamometer instrument comprising a unitary cast metal mounting base of non-magnetic material, said base including spaced parallel arms having upper surfaces lying in one plane and a laterally-extending platform joining the said arms, the upper surface of said platform being disposed above said plane to function as a support for damping means; a C-shaped, laminated yoke having side arms supported by the upper surfaces of the mounting base arms and a lateral arm spanning ends of the mounting base arms, said yoke including arcuate end surfaces forming a cylindrical air gap; means securing the yoke to the mounting base; a field coil carried by the lateral arm of the yoke; an integral, non-magnetic bracket of sheet material U-shape in edge view, having a base section abutting the ends of the base arms and parallel legs spaced from opposite surfaces of the yoke; means securing the bracket to the abutting ends of the base arms; bearing members carried by the parallel legs of the bracket; a cylindrical soft-iron core secured to the base section of the bracket, said core being disposed within the air gap of the yoke and having its peripheral surface spaced from the arcuate end surfaces of the yoke; a wire-wound movable coil pivotally supported by the said bearing members and rotatable about the said core; a pointer carried by the lower end portion of said movable coil; and spiral springs for conducting current to the movable coil.

2. The invention as recited in claim 1 wherein the means securing the yoke to the mounting base comprises a plurality of holes extending through the yoke, a plurality of holes in the upper surfaces of the base arms and alined with the holes in the yoke, and fastening screws passing through the yoke holes and threaded into the said threaded holes.

3. The invention as recited in claim 2, wherein the means securing the bracket to the mounting base arms comprises a plurality of holes in the base section of the bracket, alined threaded holes in the base arms, and fastening screws passing through the said bracket holes into the said threaded holes.

4. The invention as recited in claim 1 including a damping member secured to the platform of the mounting base, said damping member including a magnetic flux gap, and a damping vane carried by the movable coil, said vane being movable through the said flux gap upon rotation of the movable coil.

5. The invention as recited in claim 1, wherein the base portion of the U-shaped bracket includes an opening and the said pointer extends through such opening.

6. The invention as recited in claim 1, wherein the mounting base arms include transverse slots disposed in the plane of the movable coil rotational axis.

7. The invention as recited in claim 1, wherein the soft iron core has a positioning member disposed intermediate stacks of disc-shaped laminations, said member being formed as a flat plate of non-magnetic material and having a radially extending projection terminating in an end portion of reduced width, the base section of the bracket having a rectangular aperture of corresponding size and receiving said reduced-width end portion to secure the core thereto.

References Cited in the file of this patent

UNITED STATES PATENTS

| | | |
|---|---|---|
| 1,895,114 | Weston | Jan. 24, 1933 |
| 1,976,498 | Hoare | Oct. 9, 1934 |
| 2,315,587 | Bradshaw | Apr. 6, 1943 |
| 2,411,010 | Stimson | Nov. 12, 1946 |
| 2,451,886 | Stimson | Oct. 19, 1948 |